United States Patent
Wang et al.

(10) Patent No.: US 9,817,501 B2
(45) Date of Patent: Nov. 14, 2017

(54) TOUCH DISPLAY PANEL AND MANUFACTURING METHOD THEREOF

(71) Applicant: BOE TECHNOLOGY GROUP CO., LTD., Beijing (CN)

(72) Inventors: Can Wang, Beijing (CN); Lu Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 101 days.

(21) Appl. No.: 14/428,942

(22) PCT Filed: Jun. 20, 2014

(86) PCT No.: PCT/CN2014/080450
§ 371 (c)(1),
(2) Date: Mar. 17, 2015

(87) PCT Pub. No.: WO2015/106538
PCT Pub. Date: Jul. 23, 2015

(65) Prior Publication Data
US 2016/0026311 A1   Jan. 28, 2016

(30) Foreign Application Priority Data
Jan. 14, 2014   (CN) .......................... 2014 1 0016129

(51) Int. Cl.
*G06F 3/041*   (2006.01)
*G06F 3/044*   (2006.01)
*G06F 3/047*   (2006.01)

(52) U.S. Cl.
CPC ............ *G06F 3/0412* (2013.01); *G06F 3/044* (2013.01); *G06F 3/047* (2013.01); *G06F 2203/04103* (2013.01); *G06F 2203/04112* (2013.01)

(58) Field of Classification Search
CPC ............... G02F 1/1333; G02F 1/13338; G06F 2203/04103; G06F 2203/04112; G06F 3/0412; G06F 3/044; G06F 3/047
See application file for complete search history.

(56) References Cited

U.S. PATENT DOCUMENTS

2009/0213096 A1   8/2009   Kuo
2013/0147730 A1*  6/2013   Chien .................. G06F 3/0412
                                                                    345/173

(Continued)

FOREIGN PATENT DOCUMENTS

CN   103019492 A   4/2013
CN   103092411 A   5/2013

(Continued)

OTHER PUBLICATIONS

Sep. 23, 2015—(CN)—Third Office Action Appn 201410016129.1 Eng Tran.

(Continued)

*Primary Examiner* — Insa Sadio
(74) *Attorney, Agent, or Firm* — Banner & Witcoff, Ltd.

(57) ABSTRACT

Disclosed are a touch display panel and a manufacturing method thereof, the touch display panel includes an array substrate and an opposed substrate disposed oppositely; a set of first electrode lines parallel to each other disposed on the array substrate or the opposed substrate; a set of second electrode lines parallel to each other disposed on the array substrate or the opposed substrate and arranged to cross the first electrode lines. The first electrode lines and the second electrode lines have no electrical connection therebetween, and the array substrate or the opposed substrate comprises a black matrix; the first electrode lines and/or the second electrode lines correspond to positions of the black matrix and the first electrode lines and/or the second electrode lines (Continued)

corresponding to positions of the black matrix are metal electrode lines.

18 Claims, 4 Drawing Sheets

(56) References Cited

U.S. PATENT DOCUMENTS

| | | | |
|---|---|---|---|
| 2013/0244054 A1* | 9/2013 | Chu | C23C 14/025 428/631 |
| 2014/0014400 A1* | 1/2014 | Mori | B29C 45/1418 174/254 |
| 2014/0168540 A1* | 6/2014 | Wang | G06F 3/0412 349/12 |

FOREIGN PATENT DOCUMENTS

| | | |
|---|---|---|
| CN | 103207719 A | 7/2013 |
| CN | 103278955 A | 9/2013 |
| CN | 103792711 A | 5/2014 |

OTHER PUBLICATIONS

Oct. 17, 2014—International Search Report for Appn PCT/CN2014/080450 with Eng Tran of Written Opinion.

Dec. 1, 2014—(CN)—First Office Action for Appn 2014100161291 with Eng Tran.

May 5, 2015—(CN)—Second Office Action for Appn 2014100161291 with Eng Tran.

\* cited by examiner

TOUCH DISPLAY PANEL AND MANUFACTURING METHOD THEREOF

The application is a U.S. National Phase Entry of International Application No. PCT/CN2014/080450 filed on Jun. 20, 2014, designating the United States of America and claiming priority to Chinese Patent Application No. 201410016129.1 filed on Jan. 14, 2014. The present application claims priority to and the benefit of the above-identified applications and the above-identified applications are incorporated by reference herein in their entirety.

TECHNICAL FIELD

Embodiments of the present invention relate to a touch display panel and a manufacturing method thereof.

BACKGROUND

With the progressive development of display technology, a trend of integrating a touch panel function into a liquid crystal display panel is becoming more and more popular.

At present, the development routines for the embedded touch display screen mainly involve two kinds of technology: on-cell touch and in-cell touch. The difference between these two kinds of technology is as follows. The on-cell touch is a touch technology realizing the touch panel function between the color filter substrate and the polarizing plate. Specifically, a touch sensing component layer in the touch panel is fabricated on a base substrate of the color filter substrate and attached to the color filter sheet. The in-cell touch is a touch technology realizing the touch panel function within pixels. Specifically, the touch panel function is integrated into the color filter substrate and thus embedded into liquid crystal pixels. Compared with an on-cell touch panel, the in-cell touch panel has advantages such as thin thickness and light weight, which reduce the thickness of the panel and can decrease manufacturing cost as well.

In order to accord a touch display screen with a lighter and thinner display panel, embedded touch display screens in which touch electrodes are fabricated inside liquid crystal display panels have appeared; and the touch electrodes include touch scan lines and touch sensing lines. For example, touch scan lines and touch sensing lines are directly added on a thin film transistor (TFT) array substrate to implement touch function. There are formed two layers of strip-like transparent indium tin oxide (ITO) electrodes that cross each other in different planes and not electrically connected on the surface of the TFT array substrate, function as touch scan lines and touch sensing lines of the touch display screen respectively, and form inductive capacitors at the intersections of the two layers of ITO electrodes in different planes.

The operation mechanism of the capacitive embedded touch display screen is as follows. While touch scanning signals are applied to the touch scan lines, voltage signals coupled out by touch sensing lines through inductive capacity are detected. In this process, if a human body contacts the touch display screen, the electric field of human body at the touched position will act on the respective inductive capacitors to change the capacitance value thereof, and in turn change the voltage signals coupled out by touch sensing lines, and contact position can be determined according to the change of voltage signals.

With the improvement of product resolution, requirements on touch accuracy are becoming higher and higher. In order to obtain high touch accuracy, it is required to reduce the line widths of touch scan lines and touch sensing lines. However this would result in increased resistance of the touch scan lines and the touch sensing lines, and hence resulting in delay of signals.

SUMMARY

Embodiments of the present invention provide a touch display panel and a manufacturing method thereof that can reduce resistance of touch electrodes, hence improving delay of signals and improving touch accuracy at the same time.

At least one embodiment of the present invention provides a touch display panel including an array substrate and an opposed substrate disposed oppositely to each other; a set of first electrode lines parallel to each other disposed on the array substrate or the opposed substrate; a set of second electrode lines parallel to each other disposed on the array substrate or the opposed substrate and arranged to cross the first electrode lines. The first electrode lines and the second electrode lines have no electrical connection therebetween, and the array substrate or the opposed substrate comprises a black matrix. The first electrode lines and/or the second electrode lines correspond to positions of the black matrix and the first electrode lines and/or the second electrode lines corresponding to the positions of the black matrix are metal electrode lines.

For example, the first electrode lines and the second electrode lines correspond to the positions of the black matrix; the first electrode lines and the second electrode lines both are metal electrode lines.

For example, the first electrode lines correspond to the positions of the black matrix, and the second electrode lines are located in light-transmission areas of the display panel; the first electrode lines are metal electrode lines, and the second electrode lines are transparent ITO electrode lines.

For example, the first electrode lines and the second electrode lines are both provided on the opposed substrate or the array substrate, and an insulating layer is provided between the first electrode lines and the second electrode lines. Or the first electrode lines are provided on the color filter substrate and the second electrode lines are provided on the array substrate.

For example, in the case that the first electrode lines and/or the second electrode lines are provided on the opposed substrate and the opposed substrate comprises the black matrix, the first electrode lines and/or the second electrode lines are provided on a side of the black matrix of the opposed substrate that is close to the array substrate.

For example, projection of the black matrix on the opposed substrate covers projection of the first electrode lines and/or the second electrode lines corresponding to positions of the black matrix on the color filter substrate.

For example, the first electrode lines are touch scan lines, and the second electrode lines are touch sensing lines; or the first electrode lines are touch sensing lines, and the second electrode lines are touch scan lines.

For example, the touch display panel further includes signal input lines connected with the touch scan lines as well as signal collecting lines connected with the touch sensing lines.

For example, a material for the metal electrode lines comprises at least one of metal materials of molybdenum, copper, silver, aluminum or alloy materials of aluminum-neodymium alloy and aluminum-silver alloy. For example, the metal electrode lines have a thickness of 100~400 nm.

For example, the opposed substrate is a color filter substrate.

At least another embodiment of the present invention provides a manufacturing method of the above-mentioned touch display panel, including: for forming first electrode lines and/or second electrode lines corresponding to positions of the black matrix, forming a metal layer by a low temperature deposition process. The metal layer forms metal electrode lines through a masking process.

For example, forming the metal layer with a thickness of 100~400 nm by magnetron sputtering process under an atmosphere of 20° C.~50° C.

BRIEF DESCRIPTION OF DRAWINGS

In order to explain embodiments of the present invention or technical solutions in prior art more clearly, accompanying drawings that need to be used in describing embodiments or prior arts will be briefly introduced below. Obviously, accompanying drawings in the following description only relates to some embodiments of the present invention, other drawings may be obtained by one of ordinary skill in the art based on these accompanying drawings without any creative labor.

REFERENCE NUMBERS

10—array substrate; 20—color filter substrate; 200—black matrix; 30—touch electrode; 301—first electrode line; 302—second electrode line.

DETAIL DESCRIPTION

The technical solutions of the embodiments will be described in a clearly and fully understandable way in connection with the drawings related to the embodiments of the invention. Apparently, the described embodiments are just a part but not all of the embodiments of the invention. Based on the embodiments of the present invention, those skilled in the art can obtain all other embodiment(s), without any inventive work, which should be within the scope of the invention.

Figure 1:
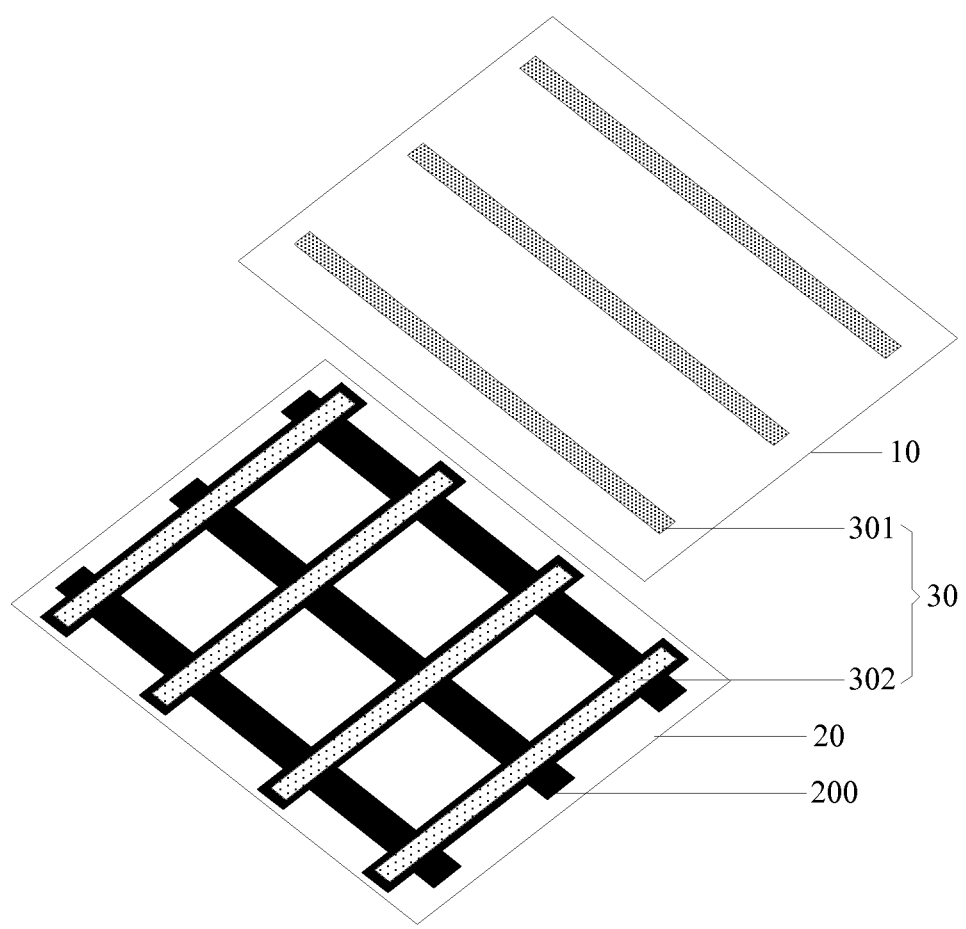
FIG. 1 is a structure diagram I of a touch display panel provided in an embodiment of the present invention.
Figure 2:
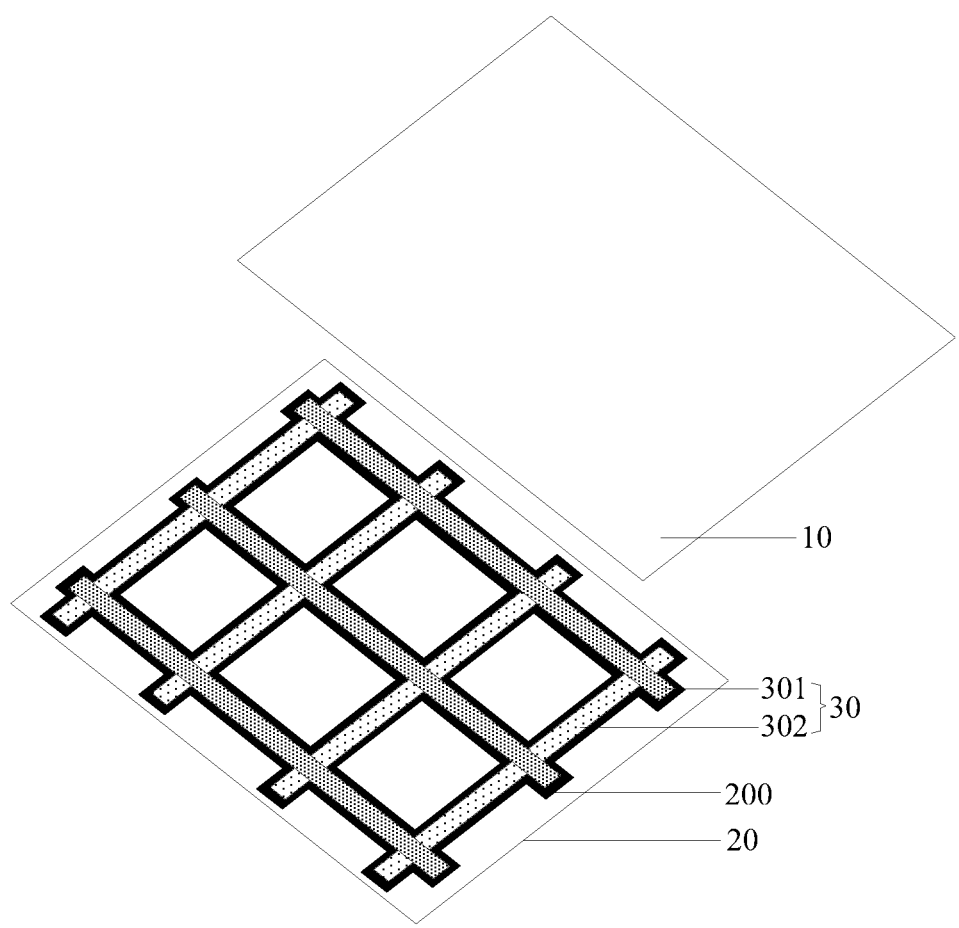
FIG. 2 is a structure diagram II of a touch display panel provided in an embodiment of the present invention.
Figure 3:
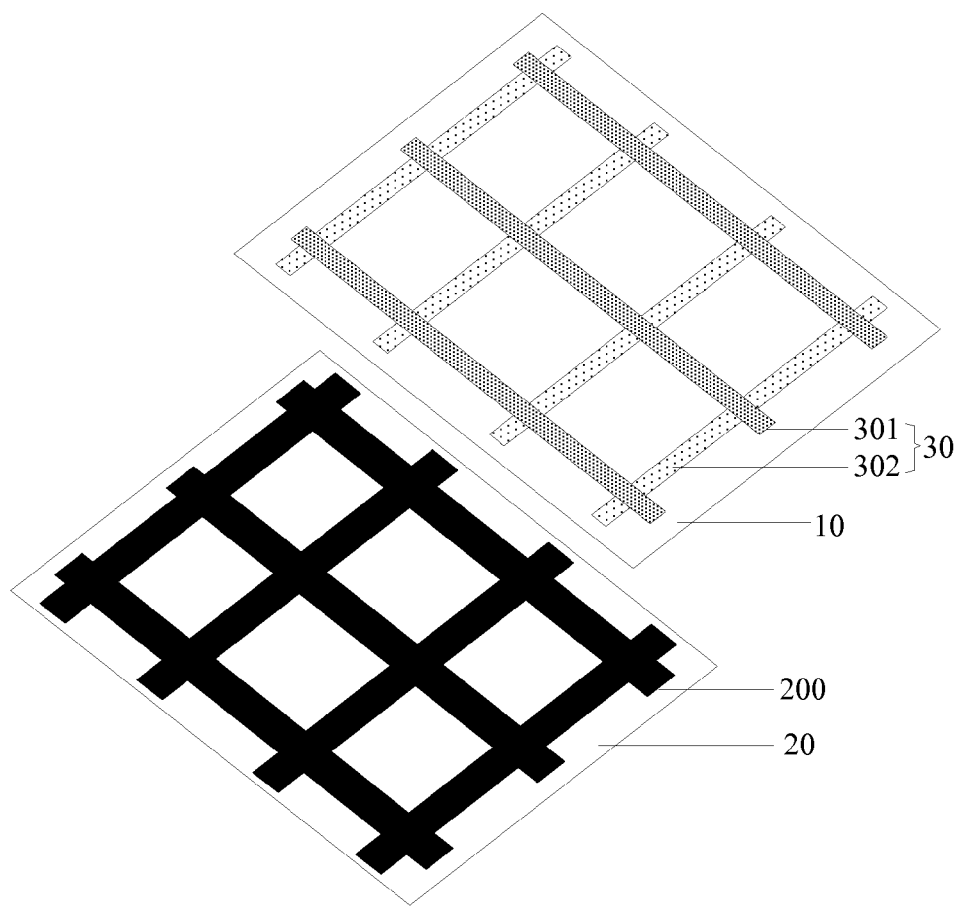
FIG. 3 is a structure diagram III of a touch display panel provided in an embodiment of the present invention.

At least one embodiment of the present invention provides a touch display panel as shown in FIGS. 1 to 3, including an array substrate 10 and a color filter substrate 20 disposed oppositely to form a liquid crystal cell; a set of first electrode lines 301 parallel to each other disposed on the array substrate 10 or the color filter substrate 20; and a set of second electrode lines 302 parallel to each other disposed on the array substrate 10 or the color filter substrate 20 and crossing the first electrode lines 301. The first electrode lines 301 and the second electrode lines 302 are not electrically connected, namely insulated from each other. The first electrode lines 301 and/or the second electrode lines 302 have positions corresponding to the black matrix 200 of the color filter substrate and the first electrode lines 301 and/or the second electrode lines 302 having positions corresponding to the black matrix 200 are metal electrode lines. That is, at least one of the first electrode lines 301 or the second electrode lines 302 having positions corresponding to the black matrix 200 are metal electrode lines.

For the touch display panel, the first electrode lines 301 and the second electrode lines 302 constitute touch electrodes 30 together. Embodiments of the present invention define the function of the touch electrodes 30 only, but do not specifically limit functions of the first electrode lines 301 and the second electrode lines 302 respectively. That is, the first electrode lines 301 may be touch scan lines, and the second electrode lines 302 may be touch sensing lines. Alternatively, the first electrode lines 301 may be touch sensing lines, and the second electrode lines 302 may be touch scan lines.

For example, in order to implement touch function, the touch display panel further includes a driving circuit(s) connected with the above mentioned touch scan lines and the touch sensing lines. For example, the driving circuit may be provided on a separate printed circuit board (PCB), and circuit parts on the PCB are electrically connected with the touch scan lines and the touch sensing lines by adhesive joining. Furthermore, for example, considering the circuit layout and factors in other aspects, in forming the touch scan lines and the touch sensing lines, leads electrically connected with each of the touch scan lines and with each of the touch sensing lines respectively are further formed (not shown in the figure). On this basis, the relevant circuit parts on the PCB are electrically connected with the touch scan lines and the touch sensing lines through the aforesaid leads.

Optionally, the touch display panel may further include signal input lines (not shown) electrically connected with the touch scan lines and signal collecting lines (not shown) electrically connected with the touch sensing lines. Here, the signal input lines and the signal collecting lines both can be provided on the PCB, electrical connections with the touch scan lines and the touch sensing lines are realized by leads electrically connected with the touch scan lines and with the touch sensing lines respectively.

For example, the above-mentioned leads may be of a metal material. When the first electrode lines 301 and the second electrode lines 302 are both metal electrode lines, the leads of the first electrode lines 301 and leads of the second electrode lines 302 may be formed together with the lines 301 and lines 302 respectively. When one set of electrode lines are metal electrode lines, another set of electrode lines are ITO electrode lines, the leads for the metal electrode lines are formed together with this set of metal electrode lines. While for reducing the number of patterning processes, the leads for the ITO electrode lines may be formed together with patterns of other metal materials, for example, leads for the metal electrode lines.

It is to be noted that, firstly, embodiments of the present invention do not limit the specific arrangement positions of the first electrode lines 301 and the second electrode lines 302; these two sets of lines can be provided on the array substrate 10 at the same time or on the color filter substrate 20 at the same time, or one set of electrode lines are provided on the array substrate 10 and another set of electrode lines are provided on the color filter substrate 20.

Secondly, the first electrode lines 301 and the second electrode lines 302 are arranged to intersect each other and without electrical connection therebetween. In this way, inductive capacitance may be produced at the intersections between the first electrode lines 301 and the second electrode lines 302; and the touch positions may be determined through variation of capacitance values of the inductive capacitances during operation of the touch display panel.

With respect to the same resistance value, the line width of a metal electrode line is narrower than that of an ITO electrode line, thereby metal electrode lines' arrangement can be relatively denser. Therefore in at least one embodiment of the present invention, it is possible to adjust spacing between adjacent ones of the first electrode lines 301 and spacing between adjacent ones of the second electrode lines 302 according to the touch accuracy demands for the touch display panel.

Thirdly, when the touch display panel is applied in a display device, it is required to ensure that arrangement positions of the touch scan lines and the touch sensing lines do not influence the light transmittance of the display device, therefore the first electrode lines 301 and the second electrode lines 302 may both be ITO electrode lines. However electrode lines of ITO material have a big defect of large resistance, using ITO electrode lines as the touch scan lines and the touch sensing lines may cause signal delay. Therefore, in some embodiments of the present invention, in order to reduce resistance of the first electrode lines 301 and/or the second electrode lines 302, metal electrode lines are preferably used for the first electrode lines 301 and/or the second electrode lines 302, and the electrode lines of metal material are disposed in regions corresponding to positions of the black matrix 200 of the color filter substrate 20, thereby avoiding the light transmittance problem with the display device that might be caused by opaqueness of a metal material.

For example, the first electrode lines 301 and the second electrode lines 302 may both be metal electrode lines and correspond to positions of the black matrix 200. It is also possible that only one set of electrode lines are metal electrode lines, and correspond to positions of the black matrix 200, while the other set of electrode lines are ITO electrode lines.

On this basis, the material for the metal electrode lines may include at least one of metal materials such as molybdenum, copper, silver and aluminum or alloy materials such as aluminum neodymium and aluminum silver. Of course, other metal or alloy materials may also be used for the metal electrode lines as long as they are metal materials helpful for reducing resistance of the first electrode lines 301 and/or the second electrode lines 302. The metal electrode lines preferably have a thickness of 100~400 nm.

Fourthly, here the expression that the first electrode lines 301 and/or the second electrode lines 302 correspond to positions of the black matrix 200 of the color filter substrate 20 means that projections of the black matrix 200 on the color filter substrate 20 can completely cover projections of the first electrode lines 301 and/or the second electrode lines 302 that correspond to the positions of the black matrix 200 on the color filter substrate 20.

At least one embodiment of the present invention provides a touch display panel including an array substrate 10 and a color filter substrate 20 disposed oppositely to form a liquid crystal cell; a set of first electrode lines 301 parallel to each other disposed on the array substrate 10 or the color filter substrate 20; a set of second electrode lines 302 parallel to each other disposed on the array substrate 10 or the color filter substrate 20 and arranged to cross the first electrode lines 301; the first electrode lines 301 and the second electrode lines 302 are not electrically connected. The first electrode lines 301 and/or the second electrode lines 302 have positions corresponding to the black matrix 200 of the color filter substrate, and the first electrode lines 301 and/or the second electrode lines 302 having positions corresponding to the black matrix 200 are metal electrode lines.

Here, the first electrode lines 301 and the second electrode lines 302 may function as touch scan lines and touch sensing lines of the touch display panel respectively. By configuring the first electrode lines 301 and/or the second electrode lines 302 as metal electrode lines, compared to using ITO electrode lines as the touch scan lines and the touch sensing lines, it is possible to effectively reduce resistance of the touch scan lines and/or the touch sensing lines, thereby improving delay of signals. In this way, given the same resistance, the line width of a metal electrode line is narrower than that of an ITO electrode line, and therefore using metal electrode lines as the first electrode lines 301 and/or the second electrode lines 302 can further increase touch accuracy of the touch display panel.

Based on the above-mentioned description, optionally, the first electrode lines 301 may correspond to positions of the black matrix 200, and the second electrode lines 302 may be located in light-transmission areas of the display panel. The first electrode lines 301 are metal electrode lines, and the second electrode lines 302 are transparent ITO electrode lines. Of course, it is also possible that the first electrode lines 301 are located in light-transmission areas of the display panel, and the second electrode lines 302 correspond to positions of the black matrix 200; and the first electrode lines 301 are transparent ITO electrode lines and the second electrode lines 302 are metal electrode lines. Here, the first electrode lines 301 and the second electrode lines 302 have interchangeable relative positions, which are not limited here.

Since the metal electrode lines have smaller resistance than the ITO electrode lines, by configuring the first electrode lines 301 or the second electrode lines 302 as metal electrode lines, it is possible to reduce resistance of the first electrode lines 301 or the second electrode lines 302 to a certain extent, thereby reducing signal delay phenomenon of the touch display panel.

Based on this, referring to FIGS. 1 to 3, further preferably, the first electrode lines 301 and the second electrode lines 302 can both correspond to positions of the black matrix 200, and the first electrode lines 301 and the second electrode lines 302 both are metal electrode lines.

In this way, by configuring both of the first electrode lines 301 and the second electrode lines 302 as metal electrode lines, it is possible to remarkably reduce resistance of the first electrode lines 301 and the second electrode lines 302, thereby improving signal delay of the touch display panel. Furthermore, by configuring both of the first electrode lines 301 and the second electrode lines 302 as metal electrode lines, it is also possible to reduce the line widths of the first electrode lines 301 and the second electrode lines 302, thereby improving touch sensitivity.

Based on this, referring to FIG. 2, the first electrode lines 301 and the second electrode lines 302 can both be provided on the color filter substrate 20. Alternatively, referring to FIG. 3, the first electrode lines 301 and the second electrode lines 302 can both be provided on the array substrate 10. In this case, since there is no electrical connection between the first electrode lines 301 and the second electrode lines 302, an insulating layer should be further included between the first electrode lines 301 and the second electrode lines 302. Alternatively and optionally, referring to FIG. 1, the first electrode lines 301 may be provided on the array substrate 10, and the second electrode lines 302 may be provided on the color filter substrate 20.

In this way, inductive capacitance may be formed at intersections between the first electrode lines 301 and the second electrode lines 302; and actual positions of touch points may be determined by variation of capacitance values of the inductive capacitances when the touch display panel is in an operation state.

Since the first electrode lines 301 and/or the second electrode lines 302 need to be electrically connected with an external driving circuit, it is required to expose part of leads of the first electrode lines 301 and/or the second electrode lines 302 to facilitate connection. Based on the above-mentioned considerations, furthermore, in the case that the first electrode lines 301 and/or the second electrode lines 302 are provided on the color filter substrate 20, the first electrode lines 301 and/or the second electrode lines 302 are preferably provided on a side of the black matrix 200 of the color filter substrate 20 that is close to the array substrate 10.

For example, where the color filters of the color filter substrate 20 are on a side of the black matrix 200 that is close to the array substrate 10, the first electrode lines 301 and/or the second electrode lines 302 may be mounted between the black matrix 200 and the color filters, or on a side of the color filters that is close to the array substrate 10. In the case that color filters of the color filter substrate 20 are on a side of the black matrix 200 that is away from the array substrate 10, the first electrode lines 301 and/or the second electrode lines 302 may be provided on a side of the black matrix 200 that is close to the array substrate 10.

Here, specific positions of the first electrode lines 301 and/or the second electrode lines 302 may not be limited as long as they facilitate the electrical connection between the first electrode lines 301 and/or the second electrode lines 302 and the driving circuit.

As can be known from the above-mentioned description, when the first electrode lines 301 and/or the second electrode lines 302 are metal electrode lines, in view of the light transmittance problem with the touch display panel, it is possible to make the metal electrode lines to correspond to positions of the black matrix 200. Based on this, in order to guarantee that the metal electrode lines have no influence on the light transmittance of the touch display panel, further optionally, projections of the black matrix 200 on the color filter substrate 20 can cover projections of the first electrode lines 301 and/or the second electrode lines 302 corresponding to positions of the black matrix 200 on the color filter substrate 20. This can guarantee that the metal electrode lines will not influence the light transmittance of the touch display panel.

In the above-mentioned embodiment, the array substrate includes a plurality of gate lines and a plurality of data lines crossing each other to define sub-pixel units arranged in matrix, each of which includes a thin film transistor as switching element and a pixel electrode and a common electrode for controlling alignment of liquid crystal. For example, a gate electrode of the thin film transistor of each sub-pixel is electrically connected with or formed integrated with a respective gate line, a source electrode is electrically connected with or formed integrated with a respective data line and a drain electrode is electrically connected with or formed integrated with a respective pixel electrode. The color filter substrate includes a black matrix and color filters. The black matrix defines sub-pixel units and avoids interference with each other of sub-pixel units, and sub-pixel units of the color filter substrate correspond to sub-pixel units of the array substrate. Color filters are formed in sub-pixel units to define colors to be displayed by respective sub-pixel units, such as red, green or blue. If no color filter is formed in a sub-pixel unit, the sub-pixel unit displays white for example.

In at least one embodiment of the present invention, the array substrate is a COA (color filter on array) type array substrate, that is, the array substrate includes color filters, and accordingly, the opposed substrate disposed oppositely to the array substrate to form a liquid crystal cell may not include color filters, but may include a black matrix. Still further, in at least one embodiment of the present invention, the array substrate includes color filters and a black matrix, and accordingly the opposed substrate disposed oppositely to the array substrate to form a liquid crystal cell may not include color filters and a black matrix.

Figure 4:
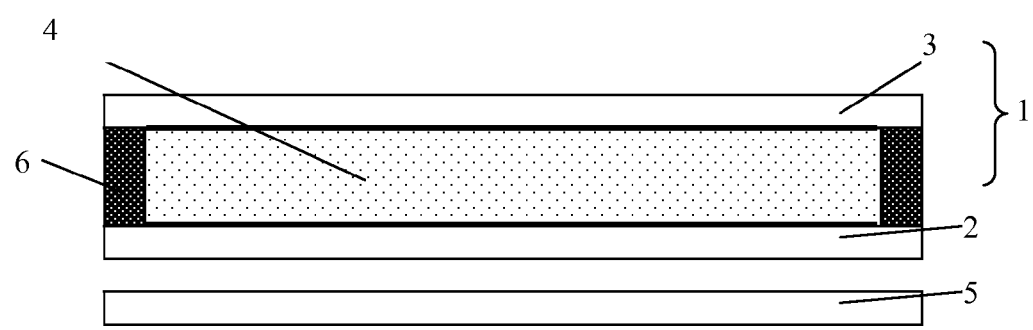
FIG. 4 is a schematic diagram of a touch display panel provided in an embodiment of the present invention.

As shown in FIG. 4, with the touch display device according to at least one embodiment of the present invention, the array substrate 2 and the opposed substrate 3 are disposed oppositely to each other and bonded together by sealant 6 to form a liquid crystal cell 1 in which liquid crystal material 4 is filled. One example of the opposed substrate 3 is a color filter substrate (for example, the color filter substrate 20 of the above-mentioned embodiment). The pixel electrode of each sub-pixel unit of the array substrate 2 is configured to apply an electric field to control the degree of rotation of the liquid crystal material, thereby implementing display operation. In some examples, the touch display device further includes a backlight source 5 for providing backlight for the array substrate.

At least one embodiment of the present invention provides a touch display panel including a first substrate and a second substrate disposed oppositely to form a liquid crystal cell, which may be the array substrate and the opposed substrate for example. The touch display panel further includes a set of first electrode lines parallel to each other disposed on the first substrate or the second substrate; and a set of second electrode lines parallel to each other disposed on the first substrate or the second substrate and crossing the first electrode lines. The first electrode lines and the second electrode lines are not electrically connected, namely insulated from each other. A black matrix is formed on one of the first substrate and the second substrate. The first electrode lines and/or the second electrode lines have positions corresponding to the black matrix and the first electrode lines and/or the second electrode lines having positions corresponding to the black matrix are metal electrode lines. The first electrode lines and the second electrode lines are touch sensing lines and touch scan lines respectively or touch scan lines and touch sensing lines respectively.

Some embodiments of the present invention further provide a manufacturing method of the above-mentioned touch display panel, including: in forming first electrode lines 301 and/or second electrode lines 302 corresponding to positions of the black matrix 200, a metal layer may be formed with a low temperature deposition process, and the metal layer is subjected to a masking process to form metal electrode lines.

The low temperature deposition process may be a deposition process implemented by low temperature magnetron sputtering method. Based on this, preferably, it is possible to form a metal layer with a thickness of 100~400 nm by the magnetron sputtering process under an atmosphere of 20° C.~50° C.

Based on this, referring to FIGS. 2 and 3, both the first electrode lines 301 and the second electrode lines 302 can be formed on the color filter substrate 20 or on the array substrate 10; and an insulating layer should also be included between the first electrode lines 301 and the second electrode lines 302. Alternatively, referring to FIG. 1, the first electrode lines 301 may be formed on the array substrate 10, and the second electrode lines 302 may be formed on the color filter substrate 20.

The first electrode lines 301 and the second electrode lines 302 may both be metal electrode lines, or one set of electrode lines may be metal electrode lines and another set electrode lines are ITO electrode lines. Based on this, the metal electrode lines are formed at positions corresponding to that of the black matrix 200, and the ITO electrode lines may be formed in light-transmission areas of the display panel.

A specific embodiment will be provided below to explain the forming process of the touch electrodes 30. In this embodiment, the first electrode lines 301 and the second electrode lines 302 are both formed on the color filter substrate 20 and are metal electrode lines, and the color filter substrate 20 includes a black matrix 200, color filters, a protection layer over the color filters, and a set of first electrode lines 301 parallel to each other formed between the black matrix 200 and the color filters, an insulating layer and a set of second electrode lines 302 parallel to each other formed on the base substrate in turn. The first electrode lines 301 and the second electrode lines 302 are arranged crossing each other.

In this case, one example of the forming process of the touch electrodes 30 may include the following steps.

Figure 5:
FIGS. 5(a)~5(c) are schematic diagrams of a manufacturing process of a touch electrode provided in an embodiment of the present invention.
Figure 5:
Figure 5:
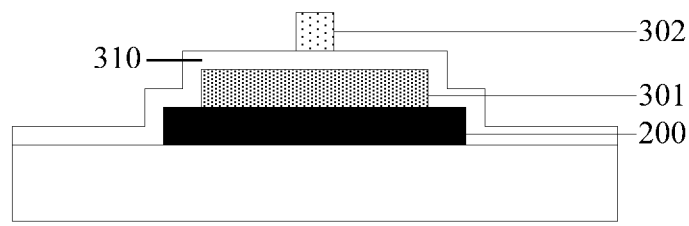

In S101, as shown in FIG. 5(a), the black matrix 200 is formed on the base substrate by one patterning process.

For example, the black matrix 200 may have a width of 7-9 μm, e.g., 8 μm. The base substrate may be a glass substrate, a plastic substrate, etc.

In S102, as shown in FIG. 5(b), after forming the black matrix 200 and lowering the temperature of the reactive chamber to wait the temperature of the reactive chamber to stabilize at a preset temperature, a layer of molybdenum metal is deposited on the substrate formed with the black matrix 200 by low temperature magnetron sputtering process, and then a set of first electrode lines 301 parallel to each other are formed by exposure, development, etching and stripping in turn.

For example, the first electrode lines 301 correspond to the position(s) of the black matrix 200.

Herein, for example, the actual temperature for the low temperature magnetron sputtering process may be room temperature 25° C. The actual thickness of the molybdenum metal layer may be 100~400 nm. The first electrode lines 301 may have a width of 7 μm.

In S103, as shown in FIG. 5(c), an insulating layer 310 is formed on the substrate formed with the first electrode lines 301.

The insulating layer 310 is configured to implement the electrical insulation between the first electrode lines 301 and the second electrode lines 302.

In S104, as shown in FIG. 5(c), after forming the insulating layer 310 and lowering the temperature of the reactive chamber until the temperature of the reactive chamber stabilizes at a preset temperature, a layer of molybdenum metal is deposited on the substrate formed with the insulating layer 310 by a low temperature magnetron sputtering process, and then a set of second electrode lines 302 parallel to each other are formed by exposure, development, etching and stripping in turn.

For example, the second electrode lines 302 correspond to positions of the black matrix 200.

Herein, for example, the actual temperature for the low temperature magnetron sputtering process may be room temperature 25° C. The actual thickness of the molybdenum metal layer may be 100~400 nm. The second electrode lines 302 may have a width of 7 μm.

In S105, the color filters are formed on the substrate formed with the second electrode line 302 and the protection layer is formed over the color filters.

With the above-mentioned steps S101-S105, the color filter substrate 20 with touch function is formed. Metal electrode lines are provided for the first electrode lines 301 and the second electrode lines 302, which may effectively reduce the signal delay caused by large resistance and increase touch accuracy of the touch display panel at the same time.

What have been described above are only specific implementations. However, the scope of the present invention is not limited thereto. One skilled in the art can easily contemplate variations or substitutions within the technical scope disclosed by the present invention, which should all be covered in the scope of the present invention. Therefore, the scope of the present invention should be defined by the scope of the described claims.

The present application claims priority of a China patent application no. 201410016129.1 filed on Jan. 14, 2014, which is incorporated in its entirety herein by reference as part of the present application.

The invention claimed is:

1. A touch display panel, comprising:
    an array substrate and an opposed substrate disposed oppositely to each other;
    a set of first electrode lines parallel to each other disposed on the array substrate or the opposed substrate; and
    a set of second electrode lines parallel to each other disposed on the array substrate or the opposed substrate and arranged to cross the first electrode lines,
    wherein the first electrode lines and the second electrode lines have no electrical connection therebetween, and the opposed substrate comprises a black matrix,
    at least one of the set of the first electrode lines and the set of the second electrode lines corresponds to a position of the black matrix and is a set of metal electrode lines,
    a projection of the black matrix on the opposed substrate covers a projection of the at least one of the set of the first electrode lines and the set of the second electrode lines corresponding to the position of the black matrix on the opposed substrate, and
    in a case that the first electrode lines and the second electrode lines are provided on the opposed substrate, an insulating layer is provided between the first electrode lines and the second electrode lines, the first electrode lines and the second electrode lines are provided on a side of the black matrix of the opposed substrate that is closer to the array substrate than an opposite side of the black matrix of the opposed substrate.

2. The touch display panel of claim 1, wherein the first electrode lines are touch scan lines, and the second electrode lines are touch sensing lines; or
    the first electrode lines are touch sensing lines, and the second electrode lines are touch scan lines.

3. The touch display panel of claim 2, further comprising signal input lines connected with the touch scan lines as well as signal collecting lines connected with the touch sensing lines.

4. The touch display panel of claim 1, wherein a material for the metal electrode lines comprises at least one of metal materials of molybdenum, copper, silver, aluminum or alloy materials of aluminum-neodymium alloy and aluminum-silver alloy.

5. The touch display panel of claim 1, wherein the metal electrode lines have a thickness of 100~400 nm.

6. The touch display panel of claim 1, wherein the opposed substrate is a color filter substrate.

7. A manufacturing method of the touch display panel of claim 1, comprising:
forming the at least one of the set of the first electrode lines and the set of the second electrode lines corresponding to the position of the black matrix, the forming the at least one of the set of the first electrode lines and the set of the second electrode lines comprising:
    forming a metal layer by a low temperature deposition process, and
    forming metal electrode lines out of the metal layer by a masking process.

8. The manufacturing method of claim 7, wherein forming the metal layer comprises:
forming the metal layer with a thickness of 100~400 nm by a magnetron sputtering process under an atmosphere of 20° C.~50° C.

9. The touch display panel of claim 1, wherein the first electrode lines and the second electrode lines both correspond to the position of the black matrix, the first electrode lines and the second electrode lines both being metal electrode lines.

10. A touch display panel, comprising:
an array substrate and an opposed substrate disposed oppositely to each other;
a set of first electrode lines parallel to each other disposed on the array substrate or the opposed substrate; and
a set of second electrode lines parallel to each other disposed on the array substrate or the opposed substrate and arranged to cross the first electrode lines,
wherein the first electrode lines and the second electrode lines have no electrical connection therebetween, and the opposed substrate comprises a black matrix,
at least one of the set of the first electrode lines and the set of the second electrode lines corresponds to a position of the black matrix and is a set of metal electrode lines,
a projection of the black matrix on the opposed substrate covers a projection of the at least one of the set of the first electrode lines and the set of the second electrode lines corresponding to the position of the black matrix on the opposed substrate, and
in a case that the first electrode lines or the second electrode lines are provided on the opposed substrate, the first electrode lines or the second electrode lines are provided on a side of the black matrix of the opposed substrate that is closer to the array substrate than an opposite side of the black matrix of the opposed substrate.

11. The touch display panel of claim 10, wherein the first electrode lines and the second electrode lines both correspond to the position of the black matrix, the first electrode lines and the second electrode lines both being metal electrode lines.

12. The touch display panel of claim 10, wherein the first electrode lines are touch scan lines, and the second electrode lines are touch sensing lines; or
the first electrode lines are touch sensing lines, and the second electrode lines are touch scan lines.

13. The touch display panel of claim 12, further comprising signal input lines connected with the touch scan lines as well as signal collecting lines connected with the touch sensing lines.

14. The touch display panel of claim 10, wherein a material for the metal electrode lines comprises at least one of metal materials of molybdenum, copper, silver, aluminum or alloy materials of aluminum-neodymium alloy and aluminum-silver alloy.

15. The touch display panel of claim 10, wherein the metal electrode lines have a thickness of 100~400 nm.

16. The touch display panel of claim 10, wherein the opposed substrate is a color filter substrate.

17. A manufacturing method of the touch display panel of claim 10, comprising:
forming the at least one of the set of the first electrode lines and the set of the second electrode lines corresponding to the position of the black matrix, the forming the at least one of the set of the first electrode lines and the set of the second electrode lines comprising:
    forming a metal layer by a low temperature deposition process, and
    forming metal electrode lines out of the metal layer by a masking process.

18. The manufacturing method of claim 17, wherein forming the metal layer by a low temperature deposition process comprises:
forming the metal layer with a thickness of 100~400 nm by magnetron sputtering process under an atmosphere of 20° C.~50° C.

* * * * *